US005303581A

United States Patent [19]

[11] Patent Number: 5,303,581

McQueen

[45] Date of Patent: Apr. 19, 1994

[54] METHOD OF AND AN APPARATUS FOR DETECTING A FAULT IN A RETURN SYSTEM

[75] Inventor: Alastair M. McQueen, Solihull, England

[73] Assignee: Lucas Industries PLC, Solihull, England

[21] Appl. No.: 967,297

[22] Filed: Oct. 27, 1992

[51] Int. Cl.[5] .......... G01M 19/00

[52] U.S. Cl. .......... 73/118.1; 73/865.9

[58] Field of Search .......... 73/118.1, 116, 865.9, 73/866.1; 123/690

[56] References Cited

U.S. PATENT DOCUMENTS 5,150,681 9/1992 Kull et al. .......... 73/118.1 X

*Primary Examiner*—Jerry W. Myracle

*Attorney, Agent, or Firm*—Jenner & Block

[57] ABSTRACT

A return system for a throttle of an internal combustion engine has a first return device in the form of a spring for returning the throttle to a first return position and a second return device in the form of a motor for returning the throttle to a second return position beyond the first return position. A position sensor determines the first and second return positions and a fault is indicated if the second return position is not beyond the first return position.

7 Claims, 3 Drawing Sheets

METHOD OF AND AN APPARATUS FOR DETECTING A FAULT IN A RETURN SYSTEM

The present invention relates to a method of and an apparatus for detecting a fault in a return system, for instance in a closing system for a throttle of an internal combustion engine.

The mechanical connection between a driver operated control, such as an accelerator pedal of a vehicle, and a throttle in an internal combustion engine induction system is frequently replaced nowadays by a so called "drive-by-wire" system. In such a drive-by-wire system, the accelerator pedal operates a position transducer which supplies signals to an engine control unit in accordance with the position of the accelerator pedal. The electronic control unit (ECU) supplies signals which control a servo motor which controls the opening of a throttle via a suitable mechanical linkage or mechanism. Typically, a torque motor is connected to a shaft carrying the throttle and connected to a position transducer.

It is a common requirement for two "return-to-closed" systems to be provided in order to close the engine throttle when the ECU demands that the throttle be closed. These two systems are required to function independently of each other so that, should one system fail, the other system will ensure that the engine throttle is closed when required. Such an arrangement reduces the possibility of the engine operating in an undesired and possibly dangerous mode in the event of a fault or failure.

In one known arrangement of this type, one system is provided by a return spring which constantly urges the throttle towards its closed position. The second system comprises the servo motor itself which, in the absence of a fault, drives the throttle to its closed position when a suitable demand signal is received from the ECU. Thus, in the event of a failure in the servo motor, the return spring closes the throttle whereas, in the event of a failure of the return spring, the servo motor closes the throttle.

A possible problem with such an arrangement is that a dormant fault can develop and remain undetected such that, should a second failure occur, the ability of the ECU to return the throttle to its closed position may be lost. For instance, if the return spring breaks, the throttle can still be returned to its closed position by the servo motor and failure of the return spring may remain undetected. Should a fault subsequently occur in the servo motor or its drive circuitry, the engine may operate in an undesired and possibly dangerous mode. Similarly, should a fault occur in a driver of the servo motor such that the servo motor cannot close the throttle, the return spring will continue to provide this function and the fault in the second system may remain undetected unless and until the return spring fails.

According to a first aspect of the invention, there is provided an apparatus for detecting a fault in a return system, comprising first return means for urging a mechanism of the system to a first return position, second return means for urging the mechanism to a second return position beyond the first return position, means for determining the first and second return positions, and means for indicating a fault if the second return position is not beyond the first return position.

The return system may comprise a closing system, for instance a throttle closing system suitable for use with a throttle of an internal combustion engine.

The first return means may comprise a return spring. The second return means may comprise a motor.

The second return means and the position determining means may be connected via resilient means, such as a rotationally resilient shaft forming part of the mechanism, to the throttle or other device controlled by the return system. Alternatively or additionally, a resilient return end stop may be provided.

The position determining means may comprise a rotary position transducer. For instance, when the second return means is a motor, the motor and rotary position transducer may comprise part of a servo feedback system for controlling the opening of the throttle or the position of another device controlled by the return system.

According to a second aspect of the invention, there is provided a method of detecting a fault in a return system, comprising urging a mechanism of the system by a first return means to a first return position, determining the first return position, urging the mechanism by a second return means to a second return position beyond the first return position, determining the second return position, and indicating a fault if the second return position is not beyond the first return position.

It is thus possible to provide an arrangement which is capable of detecting a latent fault or failure in a return system, such as a throttle closing system. When the throttle is to be closed, for instance when an internal combustion engine is switched off, a first return means such as a spring causes the throttle mechanism to close the throttle. The second means such as a motor is then activated so as to increase the closing force to move the mechanism beyond the point which corresponds to the closed throttle. If both return means are functioning correctly, the mechanism will move further in the closing direction and subsequent operation of the engine may continue as normal. However, if a failure should occur for instance in the motor or in the motor driver, the mechanism will not be urged beyond the return position established by the first means and a fault will be indicated. Suitable action may then be taken, for instance to disable further operation of the engine or to limit operation in order to provide a "limp home" mode.

In order to detect a failure of the first return means such as the return spring, the first return position established by the first return means may be compared with a stored value, for instance corresponding to substantial closure of the throttle. If this value is not achieved by the first return means before the second return means is actuated to close the throttle, a fault indication may again be given and operation of the engine prevented or limited to a limp home mode. It is thus possible to detect a latent fault in a throttle closing system or the like so as to prevent or restrict continued operation and therefore improve the safety of the system.

The invention will be further described, by way of example, with reference to the accompanying drawings, in which.

Figure 1:
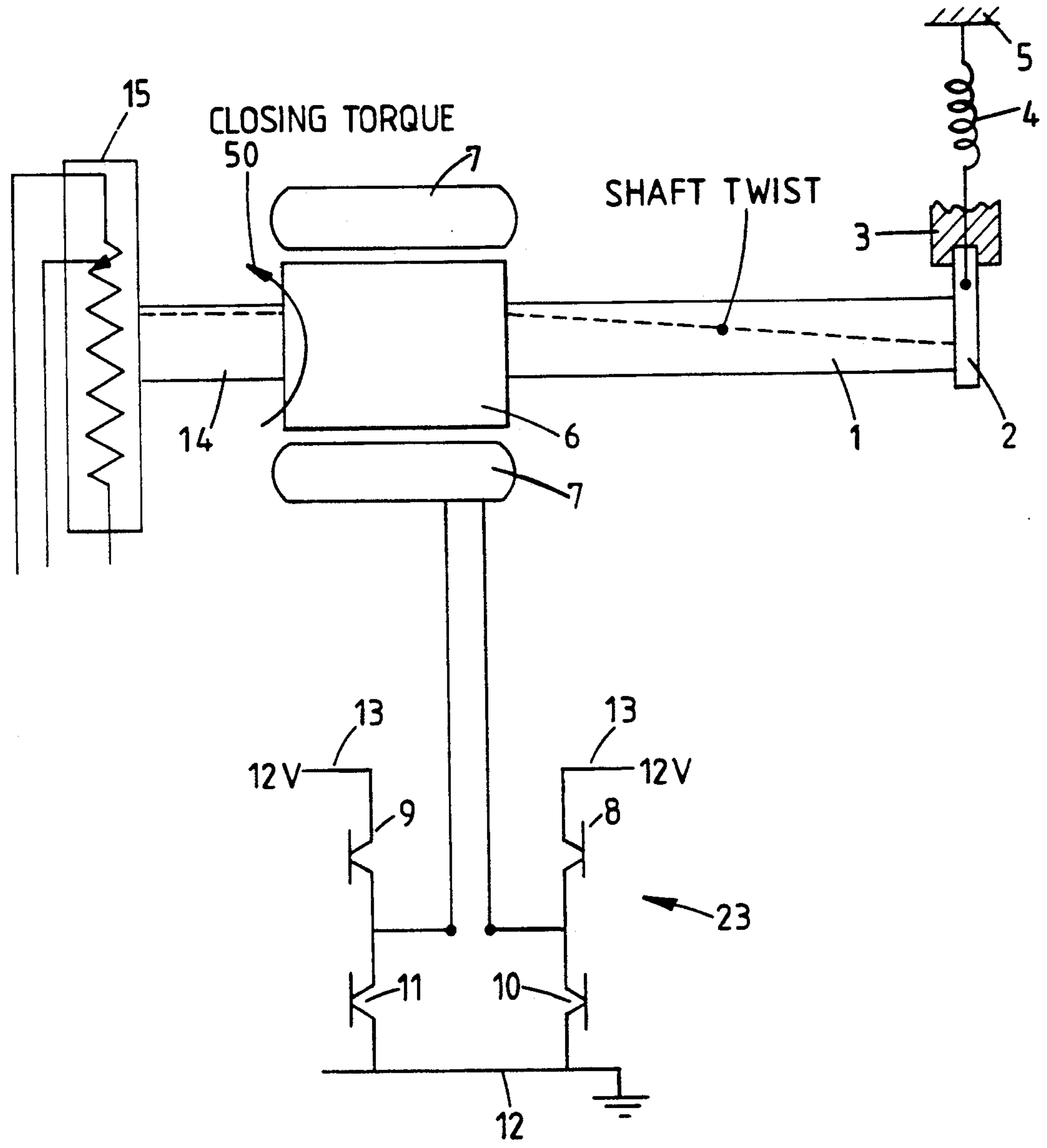
FIG. 1 is a diagram of part of a control system for a throttle of an internal combustion engine.

A throttle shaft 1 is connected at one end to a cam 2 which cooperates with a throttle closed stop 3 in order to limit the movement of a throttle (not shown in FIG. 1) in the closing direction. The cam 2 is shown, by way of example, as being connected to one end of a return spring 4 whose other end is fixed to a fixed part 5 of an engine induction system and which operates in tension so as to urge the cam 2 towards the stop 3.

The other end of the shaft 1 is connected to the hub 6 of a servo motor having motor windings 7. The windings 7 are connected to a driver of the "H bridge" type comprising power transistors 8 to 11 arranged in a bridge configuration between a common supply line 12 and a 12 volt positive supply line 13. In order to drive the motor in a first direction, the transistors 9 and 10 are turned on whereas the transistors 8 and 11 are turned off. In order to drive the motor in the opposite direction, the transistors 8 and 11 are turned on whereas the transistors 9 and 10 are turned off. Drive may be by a continuous or analogue signal, or may be by a pulsed waveform, for instance of variable duty cycle.

The motor hub 6 is connected via a shaft 14 to a rotary position sensor 15. The sensor 15 comprises a rotary variable potentiometer having a resistive track and a slider which contacts the track at a position determined by the rotary position of the shaft 14. A fixed stable voltage is applied across the resistive track so that the voltage at the slider represents the rotary or angular position of the shaft 14 and hence of the motor hub 6.

Figure 2:
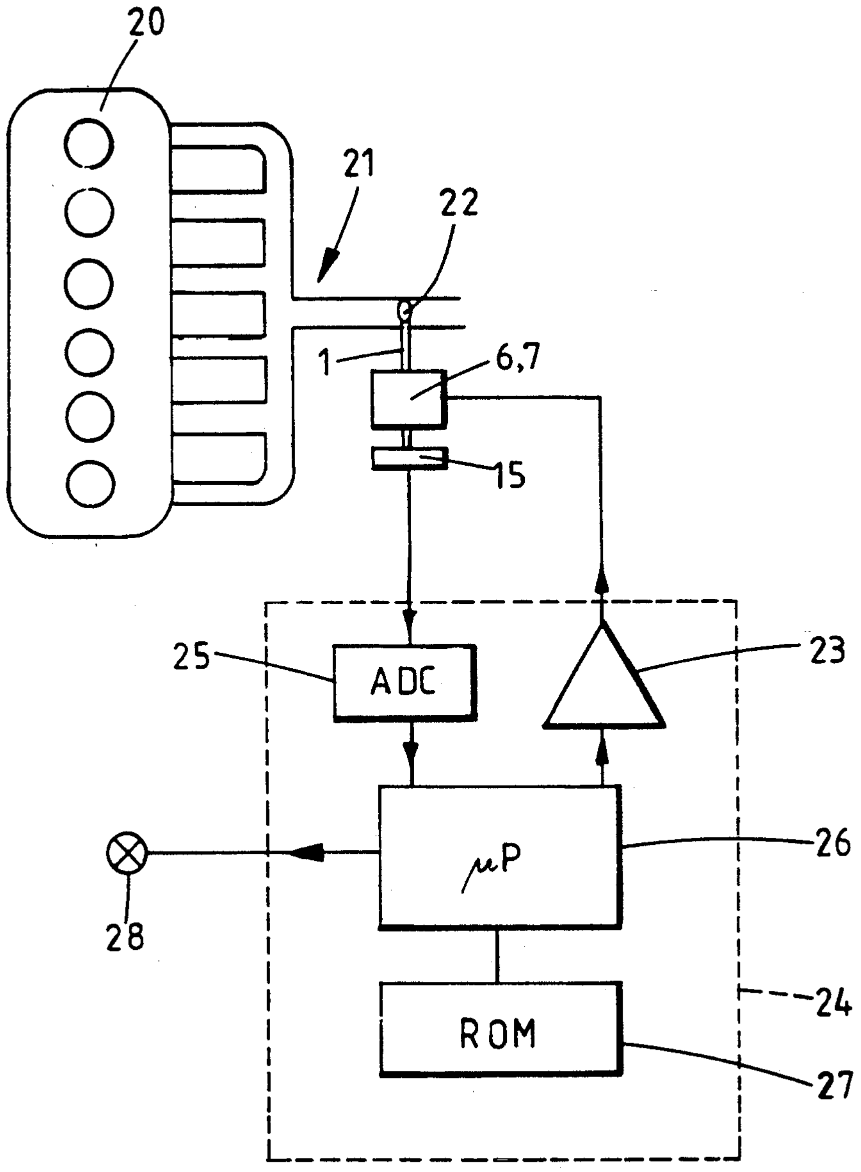
FIG. 2 is a block diagram of the throttle control system including a closing fault detection apparatus constituting an embodiment of the invention.

FIG. 2 shows an internal combustion engine 20 provided with an induction system 21 including a throttle 22 attached to the shaft 1. The throttle 22 controls the supply of air through the induction system and hence the output demand of the engine 20.

The H bridge driver of FIG. 1 is shown at 23 as part of an electronic control unit 24. The output of the position sensor 15 is connected to an analogue/digital converter (ADC) 25 whose output is connected to a microprocessor ($\mu$P) 26. A first output of the microprocessor 26 is connected to the driver 23 and, in the embodiment shown, supplies a variable duty cycle pulse output suitable for driving the motor 6, 7 directly. Alternatively, a digital/analogue converter may be provided between the microprocessor 26 and the driver 23.

Operation of the microprocessor 26 is controlled by a program stored in a read only memory (ROM) 27. The stored program provides various functions so that the electronic control unit 24 operates as an engine management system, receiving inputs from further sensors (not shown) and supplying control signals to various devices (not shown) such as a fuel injection system and an ignition timing system. The microprocessor 26 has a further output connected to an indicator 28 for providing an indication of a fault in the throttle closing system.

Figure 3:
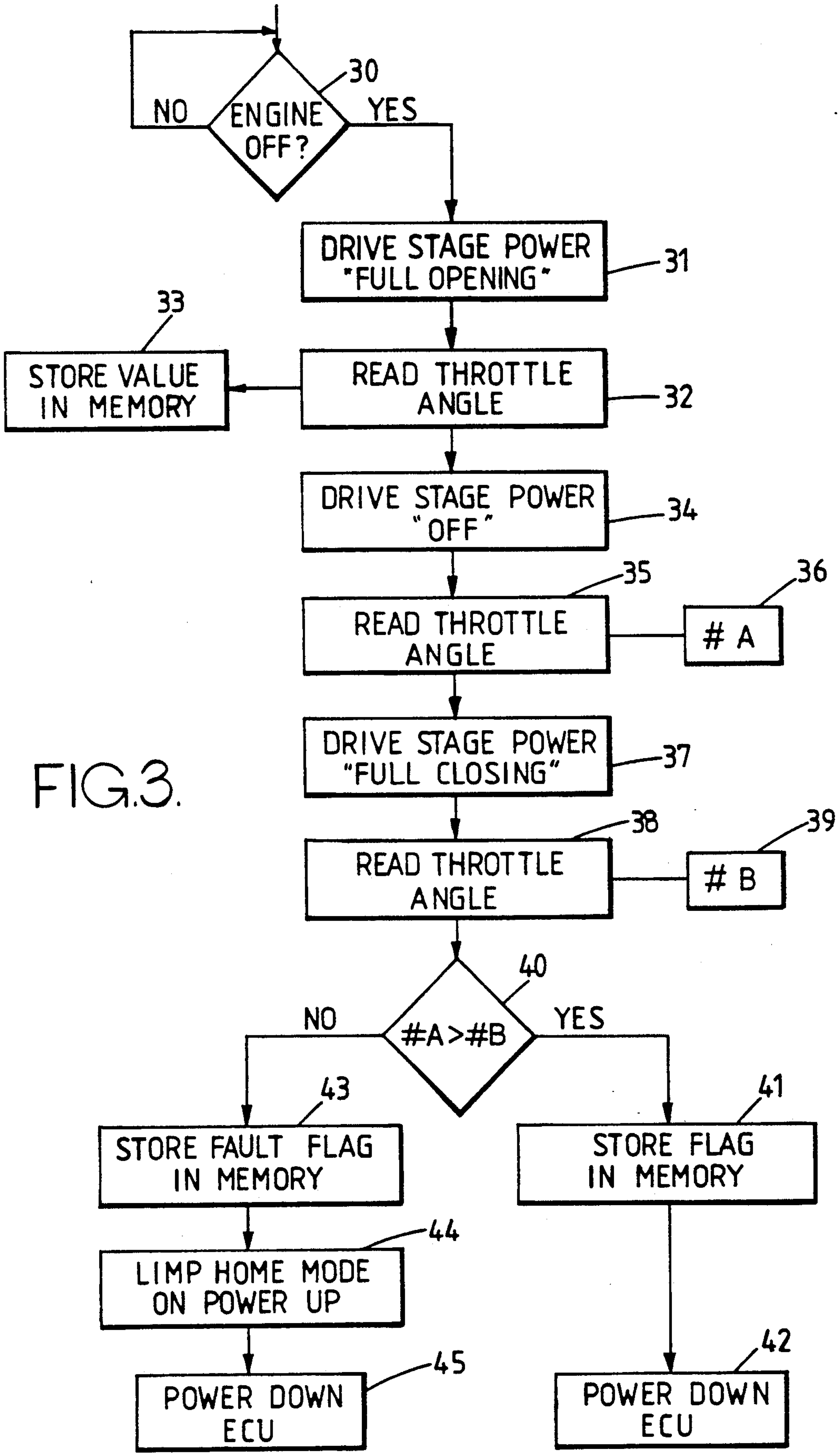
FIG. 3 is a flow diagram illustrating operation of the apparatus of FIG. 2.

The throttle closure fault determining system operates in accordance with the program illustrated by the flow diagram in FIG. 3. At 30, a periodic check is made on whether the engine 20 is operating. If the engine is operating, no further action is taken until the next check. If the engine is off, the microprocessor 26 causes, at 31, the driver 23 to supply full opening power to the motor 6, 7 so as to open the throttle fully. At 32, the throttle angle indicated by the sensor 15 is read and is stored at 33 for system calibration and checking purposes. At 34, the driver 23 is switched off.

In the absence of a fault, the return spring 4 closes the throttle such that the cam 2 abuts against the stop 3. After a suitable time interval to allow the throttle to close under the action of the spring 4, the throttle angle is read at 35 and stored as "A" at 36.

At 37, the microprocessor 26 causes the driver 23 to supply full closing power to the motor 6, 7. The motor therefore rotates the adjacent end of the throttle shaft 1 in the direction indicated by the arrow 50 in FIG. 1. The closing torque of the motor acts on the resilience of the shaft 1 such that the sensor 15 detects a position which is "more closed" than the position detected when the throttle was closed by the spring 4 without the closing torque supplied by the motor. The throttle angle is again read at 38 and stored as variable "B" at 39. The motor 6, 7 can then be deactivated by switching off the driver 23.

At 40, the variables A and B are compared. If A is greater than B, a flag is stored in non-volatile memory at 41 indicating that both throttle closing systems are functioning correctly and the electronic control unit 24 is powered down at 42 to await further operation of the engine.

In the event of a fault in the driver 23, such as one or more failed transistors, or in the motor 6, 7, when full closing power is applied in the step 37, closing torque is not applied to the shaft 1 so that the position read by the sensor 15 in the step 38 is substantially equal to or possibly greater than that read in the step 35. Thus, the step 40 detects that A is not greater than B and a step 43 stores a fault flag in memory. At 44, the electronic control unit 24 is set such that, on being powered up again for subsequent operation of the engine 20, the engine may only operate in a limp home mode. For instance, the electronic control unit 24 may be prevented from opening the throttle 22 beyond a predetermined angle corresponding to a limited relatively low engine output. This allows a vehicle driven by the engine 20 to be driven home or to a garage while preventing damage to the engine or operation of the vehicle at a dangerous speed. Finally, the electronic control unit is powered down at 45 to await further operation of the engine.

The step 43 which sets the fault flag causes the microprocessor 26 to illuminate a warning light 28 or provide any other suitable indication so as to alert a driver to the failure of the system 4. The limp home mode remains set and the indicator 28 actuated until remedial action is taken to repair the fault and the electronic control unit 24 is reset, for instance by service personnel.

Various modifications may be made within the scope of the invention. For instance, instead of or in addition to relying on the rotary resilience of the shaft 1, the end stop 3 may be made resilient such that the closing torque applied by the motor 6, 7 causes the shaft 1 to move beyond the throttle closed position established by the return spring 4. Also, the throttle angle A read at the step 35 may be compared with a predetermined angle so as to establish that the spring 40 is functioning correctly and has returned the throttle to its closed position.

The resilience between the motor hub 6 and the cam 2 may be provided by an existing mechanism between the motor and the throttle. Alternatively, steps may be taken to add or increase this resilience, for instance by providing the shaft 1 with a higher degree of resilience than is conventional.

Although the rotary position sensor 15 is shown on the opposite side of the motor hub 14 to the throttle shaft 1, the sensor 15 may be provided at any suitable location such that it is capable of detecting the additional movement caused when the motor 6, 7 exerts closing torque.

It is thus possible to provide an arrangement which reliably detects otherwise latent faults in one or more systems for closing an engine throttle. The possibility of an engine operating in an undesirable mode is thus substantially reduced and a fault or failure can be rapidly repaired so as to restore correct full operation of the engine throttle control system.

I claim:

1. An apparatus for detecting a fault in a return system, comprising first return means for urging a mechanism of the system to a first return position, second return means for urging the mechanism to a second return position beyond the first return position, position determining means for determining the first and second return positions, and fault indicating means for indicating a fault if the second return position is not beyond the first return position.

2. An apparatus as claimed in claim 1, in which said first return means comprises a spring.

3. An apparatus as claimed in claim 1, in which said second return means comprises a motor.

4. An apparatus as claimed in claim 1, in which said second return means and said position determining means are connected to the mechanism via resilient means.

5. An apparatus as claimed in claim 4, in which said resilient means is a rotationally resilient shaft.

6. An apparatus as claimed in claim 1, in which said position determining means is a rotary position transducer.

7. A method of detecting a fault in a return system, comprising urging a mechanism of the system by a first return means to a first return position, determining the first return position, urging the mechanism by a second return means to a second return position beyond the first return position, determining the second return position, and indicating a fault if the second return position is not beyond the first return position.

* * * * *